(12) United States Patent
Ushinsky et al.

(10) Patent No.: US 7,630,423 B2
(45) Date of Patent: Dec. 8, 2009

(54) GLAZE SOLDERED LASER COMPONENTS AND METHOD OF MANUFACTURING

(75) Inventors: Michael Ushinsky, Irvine, CA (US); Alexander A. Betin, Manhattan Beach, CA (US); Richard Gentilman, Acton, MA (US); Patrick K. Hogan, Arlington, MA (US); Randal W. Tustison, Andover, MA (US)

(73) Assignee: Raytheon Company, Waltham, MA (US)

(*) Notice: Subject to any disclaimer, the term of this patent is extended or adjusted under 35 U.S.C. 154(b) by 188 days.

(21) Appl. No.: 11/103,894

(22) Filed: Apr. 12, 2005

(65) Prior Publication Data

US 2006/0227829 A1    Oct. 12, 2006

(51) Int. Cl.
 *H01S 3/17* (2006.01)
(52) U.S. Cl. ............... 372/40; 372/68; 372/39
(58) Field of Classification Search ........ None
 See application file for complete search history.

(56) References Cited

U.S. PATENT DOCUMENTS

| | | | |
|---|---|---|---|
| 4,018,374 A | | 4/1977 | Lee et al. |
| 4,350,532 A | * | 9/1982 | Randklev ............ 106/31.95 |
| 4,507,787 A | | 3/1985 | Daly et al. |
| 4,931,414 A | * | 6/1990 | Wood et al. ............ 501/103 |
| 5,394,420 A | * | 2/1995 | Senn et al. ............ 372/39 |
| 5,846,638 A | | 12/1998 | Meissner et al. |
| 5,852,622 A | | 12/1998 | Meissner et al. |
| 5,974,061 A | | 10/1999 | Byren et al. |
| 6,025,060 A | | 2/2000 | Meissner et al. |
| 6,507,446 B2 | | 1/2003 | Yamashita et al. |
| 6,587,488 B1 | | 7/2003 | Meissner et al. |
| 7,158,546 B2 | * | 1/2007 | Kouta et al. ............ 372/19 |

FOREIGN PATENT DOCUMENTS

| | | |
|---|---|---|
| EP | 0 820 129 A1 | 1/1998 |
| EP | 0 854 551 | 7/1998 |
| GB | 1 454 496 | 11/1976 |
| GB | 2402936 A  * | 12/2004 |

OTHER PUBLICATIONS

Ushitskii M. U. & Karakozov E.S., Calculating some of the parameters of the pressure welding of tubes. Paton Welding Journal (Automatic Welding), 1977, No. 1, pp. 10-12.
Ushitskii M.U. & Karakozov E.S., Development of contact during pressure welding using thermal stresses. Paton Welding Journal (Automatic Welding), 1979, No. 7, pp. 31-34.

(Continued)

*Primary Examiner*—Minsun Harvey
*Assistant Examiner*—Sean Hagan
(74) *Attorney, Agent, or Firm*—Leonard A. Alkov

(57) ABSTRACT

A glaze soldered solid-state laser active medium. The novel laser active medium includes a first section of a first material, a second section of a second material, and a layer of ceramic glaze joining the two sections. The first and second materials may be identical, similar, or dissimilar, and may include crystals or ceramics. The glaze is a multi-oxide eutectic ceramic glaze having a refractivity, light absorption, thermal expansion, and fusion temperature that are compatible with the first material. The sections are joined using a novel glaze soldering process that includes the steps of positioning the sections, applying the ceramic glaze between the sections, and firing the glaze to solder the sections together.

27 Claims, 3 Drawing Sheets

OTHER PUBLICATIONS

Fujitysu S., et al.,Joining of Single-Crystal Sapphire to Alumina Using Silicate Glasses, Journal of the Ceramic Society of Japan, 2003, 111, [7], pp. 448-451.

Kronberg T., Modeling and Optimization of Glaze Properties. Glazes and New Glazing Techniques, Tampere, 2002.

* cited by examiner

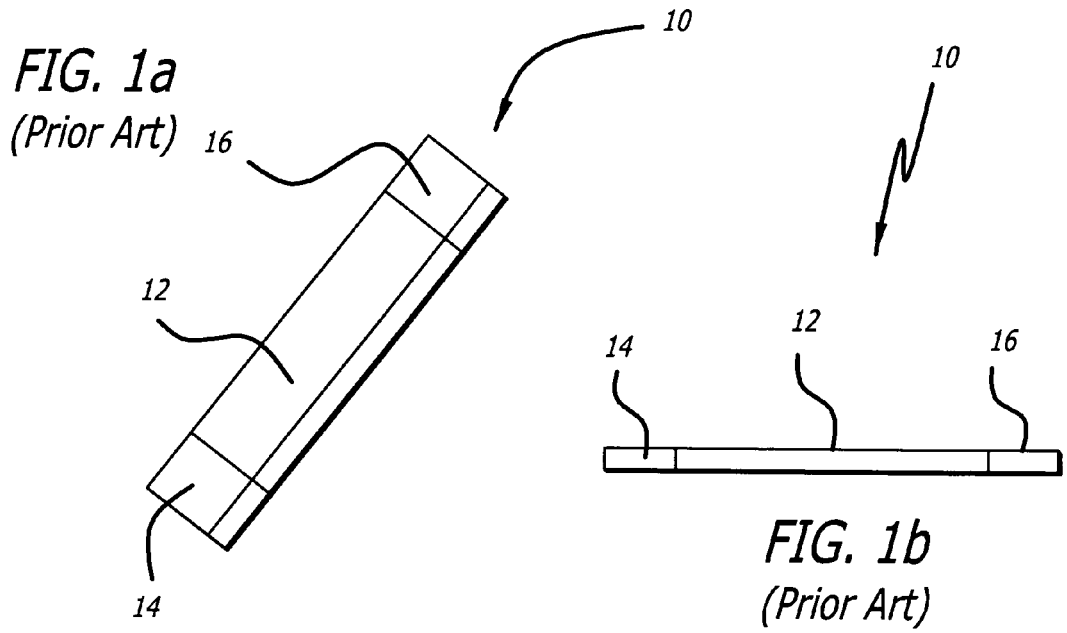
FIG. 1a (Prior Art)
FIG. 1b (Prior Art)
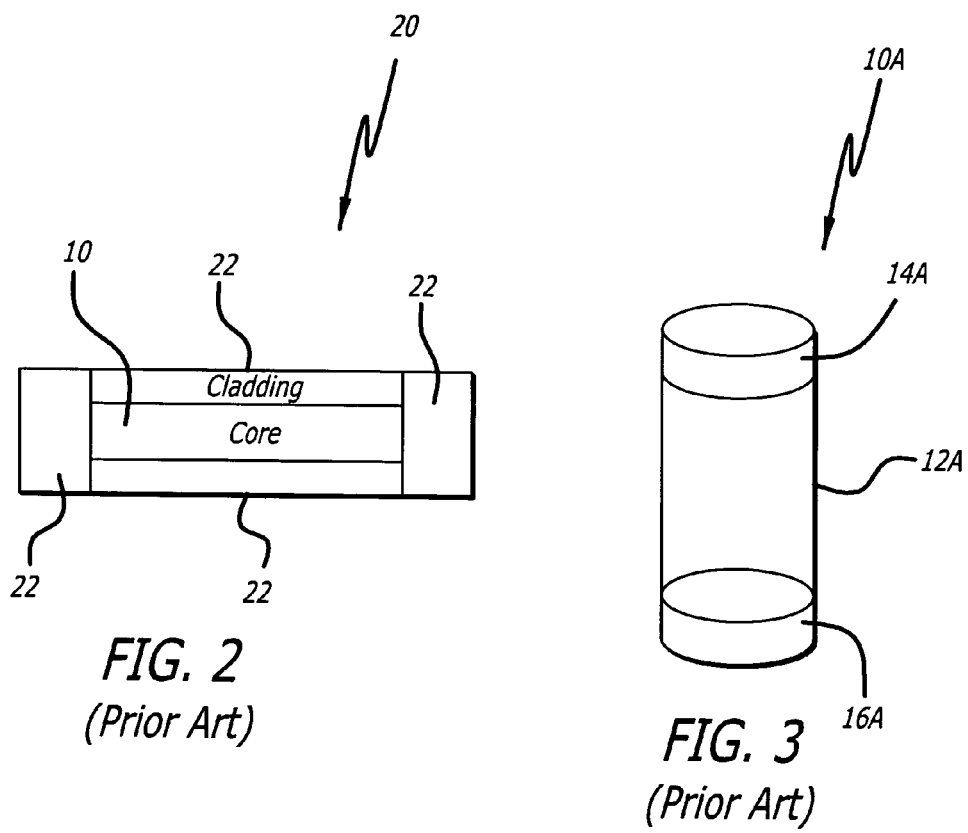
FIG. 2 (Prior Art)
FIG. 3 (Prior Art)

GLAZE SOLDERED LASER COMPONENTS AND METHOD OF MANUFACTURING

BACKGROUND OF THE INVENTION

1. Field of the Invention

The present invention relates to solid-state laser technology. More specifically, the present invention relates to techniques and materials for joining laser components.

2. Description of the Related Art

Recent advances in high-energy diode-pumped solid-state lasers have facilitated extensive developments in the architecture of laser components such as laserable slabs, rods and disks. Solid-state laser slabs typically include a thin planar solid-state gain medium (core plate) that is encapsulated by a solid crystal cladding. The core plate, primarily having a rectangular cross-section, is a key laser component affecting beam quality at high energy levels. Commercial laser slabs are typically comprised of single crystals, such as Yb:YAG (ytterbium doped yttrium-aluminum-garnet) and Nd:YAG (neodymium doped yttrium-aluminum-garnet), or polycrystalline transparent ceramics, such as $Y_3A_{15}O_{12}$. The core plate often includes two undoped input and output sections bonded to a doped central section. The bonded core is then structurally integrated with a peripheral crystal plate cladding made from material (such as Sapphire, Spinel, or related ceramics) having a step-index refractivity interface with the core to suppress parasitic oscillations that deplete energy in the core gain medium. In addition, a laser slab may also include various prisms joined to the input and output sections for inserting pump light and extracting laser energy from the slab.

These multiple components need to be joined together without introducing any optical defects in the laser slab. Conventionally, laser components are joined using diffusion bonding. Diffusion bonding typically includes placing the joining crystal or ceramic units in intimate contact and applying external pressure and heat, so the units can be bonded together uniformly throughout. The pressure and temperature can be constant or variable, including various programmable cycles. Various pressurization techniques include those using "hot presses", hydrostatic systems, statically indeterminate systems (which develop intrinsic thermal stresses when heated), and the techniques based on van der Vaals force-assisted optical contacting. All these pressurization techniques, as well as precision grinding and polishing, are commonly used in the fabrication of core components.

Diffusion bonding of laser components, however, meets enormous difficulties, particularly when bonding dissimilar materials such as YAG and Sapphire. The thermal (CTE) mismatch and high temperature processing (about 1200-1700° C.), as well as the high elastic moduli of Sapphire and YAG, result in high interfacial thermal stresses localized at the slab ends. The crystal dissimilarity (hexagonal vs. cubic) and lattice mismatch between Sapphire and YAG substantially complicate the solid phase interaction between the dissimilar crystals. These difficulties lead to imperfect and low strength interface formation with strong propensity to delamination, reduced thermal conductivity at the imperfect interface, and energy leaks. In addition, diffusion bonding requires very high precision polishing of the components to be joined. This is a time-consuming and expensive process.

Glass soldering is a well-known technique widely used in electronics and micro-optics for sealing of cathode tubes, liquid crystal displays, micro-optic components, hermetic encapsulation of glass and metal electronic packages, etc. Glass soldering typically uses high temperature melting glasses. In spite of the existing popularity of glass soldering, its application for laser components meets substantial limitations, primarily associated with the high temperature processing, which causes a haze appearance in YAG and increases its light absorption and scattering.

Hence, a need exists in the art for an improved system or method for joining laser components that is more effective and less expensive than conventional approaches.

SUMMARY OF THE INVENTION

The need in the art is addressed by the glaze soldered solid-state laser active medium of the present invention. The novel laser active medium includes a first section of a first material, a second section of a second material, and a layer of ceramic glaze joining the two sections. The first and second materials may be identical, similar, or dissimilar, and may include crystals or ceramics. The glaze is a multi-oxide eutectic ceramic glaze having a refractivity, light absorption, thermal expansion, and fusion temperature that are compatible with the adherent materials. The sections are joined using a novel glaze soldering process that includes the steps of positioning the sections, applying the ceramic glaze between the sections, and firing the glaze to solder the sections together.

BRIEF DESCRIPTION OF THE DRAWINGS

FIG. 1a is a perspective view of a conventional laser slab, comprised of a thin core plate having a rectangular cross-section and including a doped central section and two undoped input and output sections.

FIG. 1b is a side view of the conventional laser slab of FIG. 1a.

FIG. 2 is a cross-sectional view of a conventional laser slab with plate cladding.

FIG. 3 is a perspective view of a conventional laser rod having a circular cross-section and including a doped central section and two undoped input and output sections.

DESCRIPTION OF THE INVENTION

Figure 4:
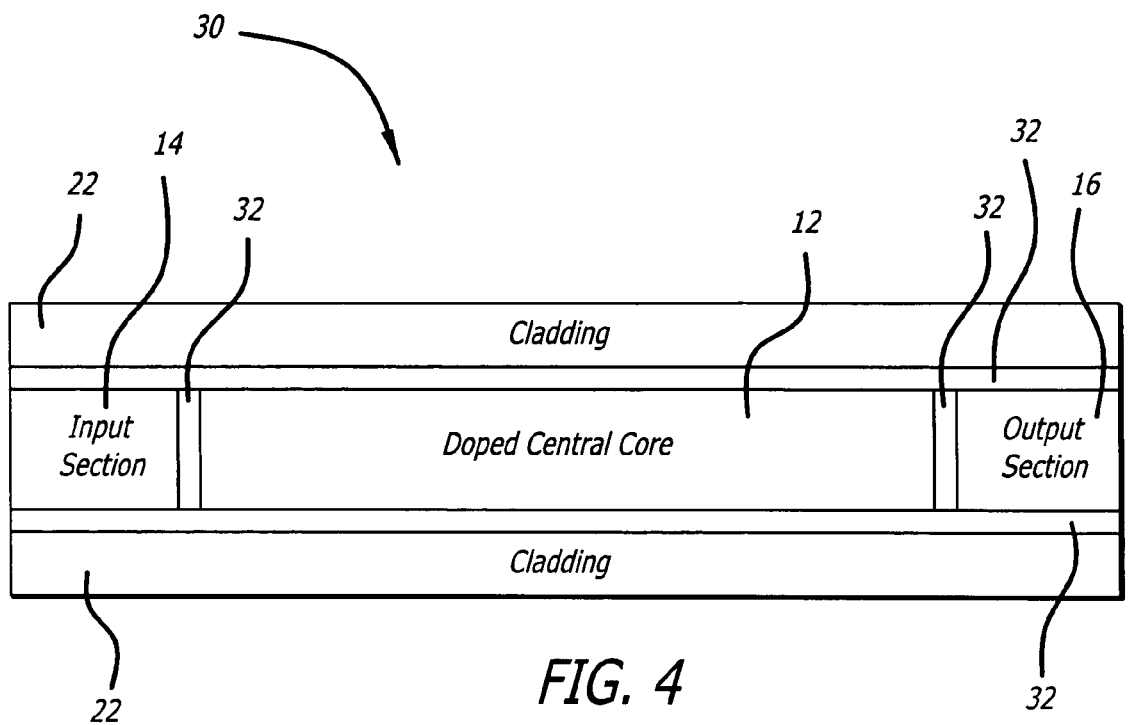
FIG. 4 is a side view of an illustrative glaze soldered laser slab designed in accordance the teachings of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

A laser component typically includes a plurality of sections including a doped central core, undoped input and output sections, cladding, and various attached prisms. FIGS. 1-3 show a few example laser component configurations.

FIG. 1a is a perspective view of a conventional laser slab 10, and FIG. 1b is a side view of the conventional laser slab 10 of FIG. 1a. The laser slab 10 is comprised of a thin core plate having a rectangular cross-section and including a doped central section 12, an undoped input section 14, and an undoped output section 16. The core (solid-state gain medium) can be made from single crystals such as Yb:YAG and Nd:YAG, or from similar oxides in the form of nanocrystalline and fully transparent ceramics, or from combinations of crystals and ceramic sections. Diffusion bonding is typically used to bond these sections.

FIG. 2 is a cross-sectional view of a laser slab 20 with conventional plate cladding. The laser slab 20 includes a Yb:YAG/YAG crystal composite core plate 10 that is peripherally encapsulated by solid Sapphire cladding plates 22. The cladding plates 22 are attached to the core plate 10 using conventional diffusion bonding.

Laser slabs for high-energy applications typically have a rectangular cross-section. The invention, however, is not limited thereto. Other shapes can also be used without departing from the present teachings. For example, FIG. 3 is a perspective view of a conventional laser rod 10A having a circular cross-section and including a doped central section 12A and two undoped input and output sections 14A and 16A.

As discussed above, diffusion bonding is typically used to join the multiple sections of a laser component. There are, however, many difficulties associated with diffusion bonding. In accordance with the teachings of the present invention, the sections of a laser component are joined together using glaze soldering.

FIG. 4 is a side view of an illustrative glaze soldered laser slab 30 designed in accordance the teachings of the present invention. The laser slab 30 includes several components: a doped central core 12 fabricated from a solid-state gain medium such as Yb:YAG, an undoped input section 14, an undoped output section 16, and cladding plates 22 fabricated from a cladding material such as Sapphire. In accordance with the teachings of the present invention, these components are joined together using multi-component eutectic oxide ceramic glaze. Thin layers of glaze 32 are applied between the laser core components and fired to solder the components together. Note that the thickness of the glaze layers 32 in FIG. 4 is exaggerated for illustrative purposes. The thickness of the solder layer should be thin (about wavelength) to reduce the effects of any differences in refractivity between the glaze and the core materials.

Ceramic glazes are commonly available and inexpensive materials used primarily for pottery and electronics applications. They have not previously been considered for use in lasers or optical systems. Glaze manufacturers therefore typically do not list the optical characteristics such as refractivity and light absorption of the glazes. One of ordinary skill in the art, however, can experimentally determine the refractivity of a glaze.

The selected glaze should have: 1) a desirable refractivity that closely matches the refractivity of the core materials (preferably within 0.03 difference); 2) low light absorption for both pump and signal wavelengths (on the order of about $10^{-4}$ cm$^{-1}$ or better); 3) close thermal (CTE) compatibility with the core materials (within 1 part per million difference); and 4) low to moderate fusion temperatures (certainly less than the bonding temperatures of the core materials). Preferably, the thermal conductivity and diffusivity should be high enough to provide an efficient heat transfer where it is needed. They also can be similar to those parameters in the core materials. This is not necessary, however, since the glaze layer is typically very thin thus the thermal resistance is low. When the optical and thermal parameters of the selected glaze are compatible with the parameters of core materials, then the anticipated reflection, scattering, and acoustic resonance bouncing, as well as thermal excursion and stress-induced birefringence are minimized.

The eutectic ceramic glazes applicable for soldering of YAG materials are primarily Pb—B—Si—Al and Bi—B—Zn eutectic oxides. Table 1 correlates overall properties of electronic grade commercial glazes (primarily from manufacturers Ferro and NEG) with the properties of Yb:YAG. Their optical, thermal, and mechanical properties provide nearly stress-free interface with a refractivity difference not exceeding 0.03. For example, IP 540 Ferro and EG 2868 Ferro are commercial glazes that almost satisfy all the listed criteria for the soldering application. IP 540 Ferro is an adequate commercial soldering glaze. Its refractivity, n=1.79-1.80, is very close to the refractivity of YAG, n=1.82. The refractivity difference of 0.03 leads to the thickness of the solder layer not exceeding 5 microns. With the IP 540 Ferro glaze, the firing temperature is as low as 550-575° C., and the duration of the firing cycle is only about 1.5-2 hours.

TABLE 1

| Pb—B—Si—Al & Bi—B—Zn Commercial Glazes | YAG, Yb-doped crystals |
|---|---|
| Vitreous/polycrystalline ceramics | Crystal symmetry: cubic |
| Lattice parameters: n/a | Lattice constant: a = 12.01 A |
| Transparent at 0.18-4.5 microns | Transparent at 0.18-4.5 microns |
| Density = 2.8-3 g/cm3 | Density = 4.56 g/cm3 |
| Hardness (Mohs): 7.5-8.0 | Hardness (Mohs): 8.25-8.5 |
| Thermal conductivity: | Thermal conductivity: |
| k = 1.5-3 W/m/K (@T = 20° C.) | k = 14 W/m/K (@T = 20° C.) and k = 10.5 W/m/K (@T = 100° C.) |
| Fusion point T* = 550-900° C. | Melting point T* = 1970° C. |
| CTE = 7-9 $10^{-6}$/K (Over. = 8.4) | CTE = 7.8 $10^{-6}$/K (al) |
| Refractive index@1.0 μm: 1.7-1.82 | Refractive index@1.0 μm: 1.82 |

A variety of methods can be used to apply the glaze to the components. For example, the glaze powder can be mixed with DI (de-ionized) water to form a slurry. The slurry then can be dispensed or sprayed onto the surface of the crystal sections, dried and fired. Other methods for applying glaze can also be used without departing from the scope of the present teachings.

Figure 5:
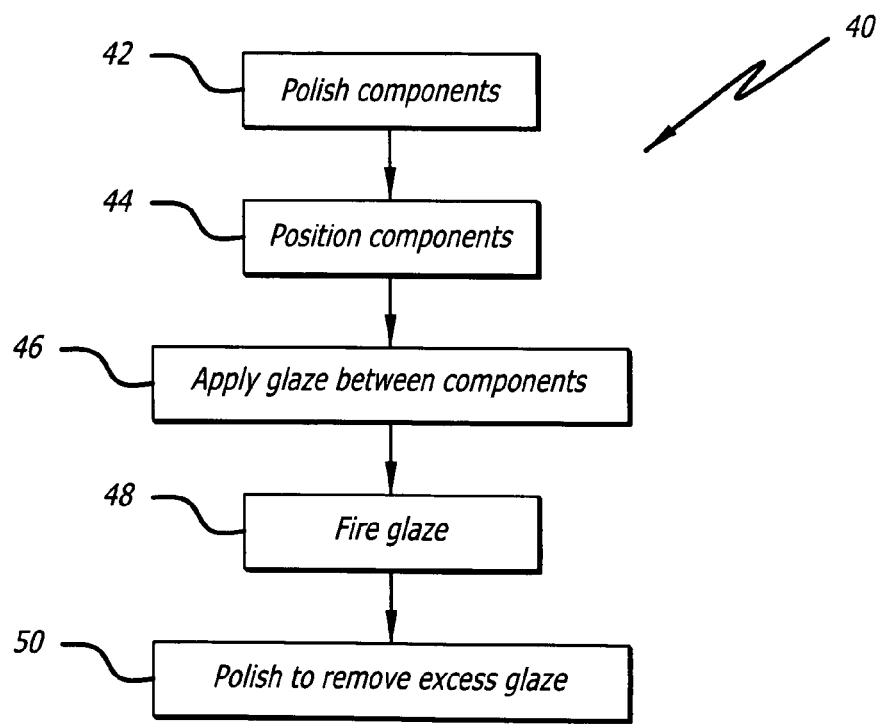
FIG. 5 is a flow chart illustrating an illustrative method for glaze soldering laser components in accordance with the teachings of the present invention.

FIG. 5 is a flow chart illustrating an illustrative method 40 for glaze soldering laser components in accordance with the teachings of the present invention. First, at Step 42, the components to be joined are machined and polished. The sections can be diced from crystal boules or ceramic pre-forms and polished. Soldering does not require a high level of polishing (as does diffusion bonding) since the glaze will provide an interface between the two components. At Step 44, the components are placed in the desired position with a gap between the two components and held in place by appropriate mounting fixtures, and at Step 46, the glaze slurry is applied to the gap to form a layer of glaze between the components. At Step 48, the glaze is fired at a temperature appropriate for the chosen glaze material. As shown in Table 1, eutectic glazes allow processing at relatively low temperatures (about 550-900° C.), significantly lower than the melting point of the gain medium (1970° C. for YAG) or heat treatment temperatures associated with conventional diffusion bonding (for instance, 1100-1700° C. for YAG-to-YAG joints). (Excessive temperatures-in crystal fabrication processes (especially those exceeding 80% of the melting point) can induce haze or otherwise damage the core crystal and are therefore undesirable.) If necessary, at Step 50, any excess glaze can be removed through polishing. This process can then be repeated to join additional components. The details of the component mounting, fixture (retaining walls), glaze application, etc. are apparent to those skilled in the art of glaze processing.

Multiple components can be soldered in one firing cycle, or separately. For alignment purposes, it may be desirable to solder each interface separately. For example, the input section can be soldered to the central core during a first firing cycle, and the output section can be soldered to the central core during a subsequent second firing cycle. In this case, multiple glazes can be used for the soldering, each glaze having a different firing temperature. Thus, successive firing cycles can use glazes with lower firing temperatures to prevent previously soldered interfaces from melting.

Figure 6:
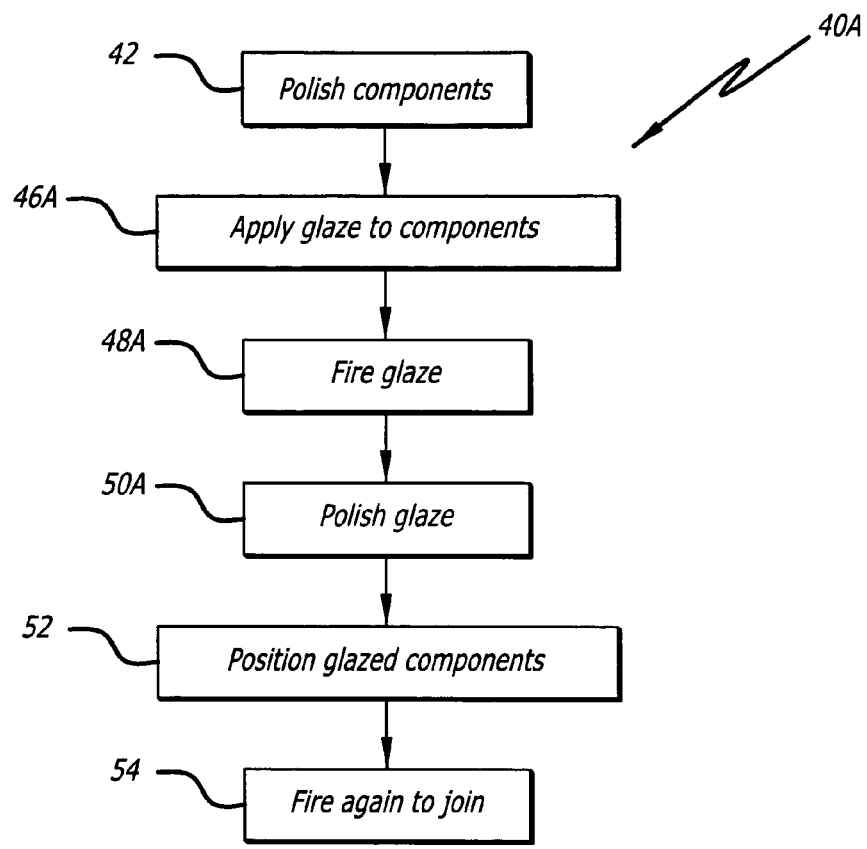
FIG. 6 is a flow chart illustrating an alternate method for glaze soldering laser components in accordance with the teachings of the present invention.
Figure 7:
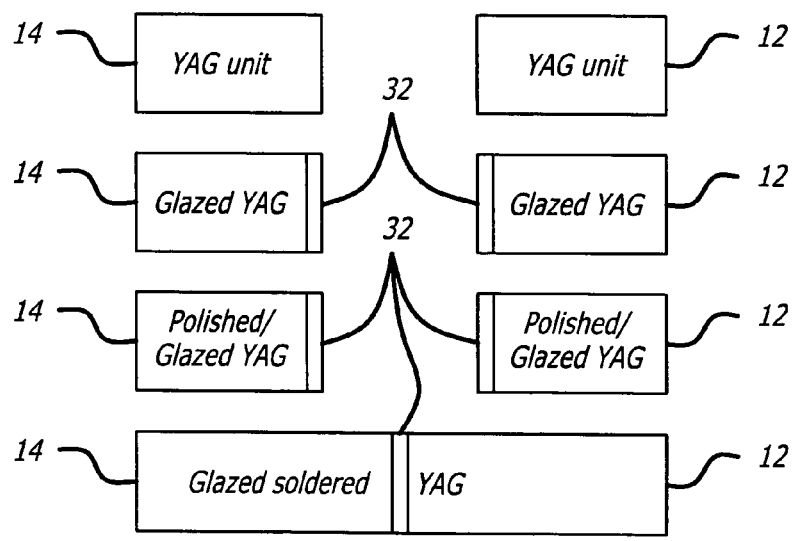
FIG. 7 is a diagram illustrating the method shown in FIG. 6.

FIG. 6 is a flow chart illustrating an alternate method 40A for glaze soldering laser components in accordance with the teachings of the present invention, and FIG. 7 is a diagram illustrating this method with butt joint soldering of two core sections. At Step 42, the components (a doped YAG core 12 and undoped YAG input section 14 are shown in FIG. 7) are polished. At Step 46A, a layer of glaze 32 is applied to each component on the surfaces to be joined together. At Step 48A, the two components are then fired to form two components (still separate) each with a glazed surface. At Step 50A, each glaze layer 32 is polished so that it becomes flat. In addition, the thickness of the fired glaze layer 32 may be greater than desired, so the glaze layer 32 can be polished to reduce its thickness. At Step 52, the two components are positioned together with the two glaze layers in intimate contact. If desired, by applying axial pressure to the soldering units, the thickness of the solder layer can be additionally reduced. At Step 54, in a second firing cycle, the sections are fired again to join the components together and complete the soldering process. This method allows for more control over the formed glaze interface.

An alternate method for glaze soldering involves the use of pre-formed glaze sheets. The selected glaze can be pre-fired and machined into strips or sheets of the desired thickness. The pre-formed sheets are then mounted between components to be joined and fired again in a secondary firing cycle, thereby soldering the components together. The use of these glaze pre-forms may be preferable to ensure a more uniform interface. Glaze pre-forms may also be easier to apply to large area crystals or ceramics. In addition, since the glaze has been pre-melted to form cladding strips, re-melting them requires less energy and lower temperatures. In contrast to crystalline raw oxides that melt suddenly, the pre-melted glazes soften over a range of temperatures. The melting temperature of the secondary cycle can therefore be reduced.

Eutectic glazes are typically powdered mixes of three to four oxides, alkalis, etc. The first stage of glazing is a fritting that typically includes a) mixing of the powdered oxides, b) melting, c) quenching in cold water, and d) grinding into a fine powder. The raw glaze often does not mix well to form an evenly dispersed multi-oxide powder. The fritting employs only mechanical mixing to assure homogeneity of the glaze cladding layer. The dissolution and much localized migration can also affect the homogeneity. With the above re-melting step, even at the lowered fusion temperature, the homogeneity of the re-processed glaze improves its refractivity and reduces its light absorption.

In addition, with the suggested glaze pre-forms and the lower temperature re-melting, there may be some reduction in the devitrification of the glaze when cooling, as well as reduction in hairline cracking (dunting) and crazing (if any).

Among other benefits of the multi-oxide eutectic ceramics is the possibility to optimize commercial glazes and, therefore, their properties, primarily their refractivity and thermal expansion. By understanding why different oxides have certain properties, specialists experienced in the field of ceramics will be able to select the proper commercial glaze and modify its refractivity and linear expansion for a desired slab design and firing cycle.

Eutectic glaze soldering is applicable to all joints existing in composite laser components, such as butt, lap (including scarf, tapered lap, overlap, etc), and various strap joints. The glazing may include various deposition techniques: spray deposition, deposition of water-based glaze slurries, and deposition of dry glaze powders. With these solder joints, glaze soldering and deposition techniques, a wide variety of laser component designs can be accomplished.

The novel glaze soldering techniques can be used to join the main (core) sections of a laser component, as well as to join cladding units or auxiliary units (such as various prisms) to the main sections. The sections to be joined may include two laser materials—identical, similar (for instance, doped and undoped, or differently doped same basic materials), or dissimilar oxide crystals and ceramics and various combinations. For instance, a particular interest exists for joining two differently doped YAG crystals, YAG crystals and YAG ceramics, YAG and Sapphire or Spinel crystals, etc. With glaze soldering, lattice and thermal mismatches between dissimilar materials can be compromised.

Application of the glaze soldered crystal and ceramic laser components of the present invention is not limited to the described designs of slabs and rods, but to other devices and shapes, such as composite discs, coated rods of elliptical cross-section, as well as to various fiber-laser components.

Thus, the present invention has been described herein with reference to a particular embodiment for a particular application. Those having ordinary skill in the art and access to the present teachings will recognize additional modifications, applications and embodiments within the scope thereof. For example, while the invention has been described with reference to Yb:YAG/YAG composite crystals, the invention is not limited thereto. Various glaze materials, design configurations, and deposition techniques are also considered within the scope of the present invention and can be used for other crystal or ceramic gain media cores. Furthermore, while the invention has been described with reference to solid-state laser components, the glaze soldering technique can be applied to other applications to join crystal and/or ceramic materials without departing from the scope of the present teachings.

It is therefore intended by the appended claims to cover any and all such applications, modifications and embodiments within the scope of the present invention.

What is claimed is:

1. A solid-state laser active medium comprising:
   a first section of a first material, wherein said first material is yttrium-aluminum-garnet;
   a second section of a second material; and
   a layer of polycrystalline ceramic glaze joining said first and second sections, wherein said glaze has a refractive index that is compatible with yttrium-aluminum-garnet when said glaze is fired within a particular temperature range.

2. The invention of claim 1 wherein said glaze is a eutectic glaze.

3. The invention of claim 1 wherein said glaze is a multi-oxide glaze.

4. The invention of claim 1 wherein said glaze has a refractivity that closely matches a refractivity of said first material.

5. The invention of claim 1 wherein said glaze has low light absorption for pump and signal wavelengths of said first material.

6. The invention of claim 1 wherein said glaze has a close thermal compatibility with said first material.

7. The invention of claim 1 wherein said glaze has a close thermal compatibility with said first and second materials.

8. The invention of claim 1 wherein said glaze has a fusion temperature that is less than a bonding temperature of said first and second materials.

9. The invention of claim 1 wherein said first and second materials are identical.

10. The invention of claim 1 wherein said first and second materials are similar.

11. The invention of claim 1 wherein said first and second materials are dissimilar.

12. The invention of claim 1 wherein said second material is crystal.

13. The invention of claim 1 wherein said second material is yttrium-aluminum-garnet crystal.

14. The invention of claim 1 wherein said second material is ceramics.

15. The invention of claim 1 wherein said second material is cladding material.

16. The invention of claim 1 wherein said second material is Sapphire.

17. The invention of claim 1 wherein said first section is a doped central core.

18. The invention of claim 1 wherein said second section is an undoped input section.

19. The invention of claim 1 wherein said second section is an undoped output section.

20. The invention of claim 1 wherein said second section is a cladding.

21. The invention of claim 1 wherein said laser medium further includes one or more additional sections, each additional section joined to said first or second sections by a layer of ceramic glaze.

22. A solid-state laser active medium comprising:
a central core of doped yttrium-aluminum-garnet;
an input section of undoped crystal or ceramic material;
an output section of undoped crystal or ceramic material;
a first layer of eutectic polycrystalline ceramic glaze joining said central core and said input section; and
a second layer of eutectic polycrystalline ceramic glaze joining said central core and said output section, wherein said glaze has a refractive index that is compatible with yttrium-aluminum-garnet when said glaze is fired within a particular temperature range.

23. The invention of claim 22 wherein said laser medium further includes one or more cladding sections, each cladding section joined to said central core, input section, and output section by a layer of eutectic ceramic glaze.

24. The invention of claim 22 wherein said laser medium further includes one or more auxiliary units, each auxiliary unit joined to said central core, input section, or output section by a layer of eutectic ceramic glaze.

25. The invention of claim 1 wherein said polycrystalline ceramic glaze has a eutectic composition including lead, silica, and alumina.

26. The invention of claim 1 wherein said polycrystalline ceramic glaze has a eutectic composition including bismuth, boron, and zinc.

27. A method for forming a laser component including the steps of:
providing a first section of yttrium-aluminum-garnet;
providing a second section;
applying a layer of polycrystalline ceramic glaze between said first and second sections; and
firing said glaze to join said sections at a temperature such that upon solidification said glaze has a refractive index that is compatible with yttrium-aluminum-garnet.

* * * * *